United States Patent Office 2,966,482
Patented Dec. 27, 1960

2,966,482

POLYMERS OF PERFLUOROBUTYNE-2

Archibald N. Bolstad, Maplewood, and Francis J. Honn, Westfield, N.J., assignors, by mesne assignments, to Minnesota Mining and Manufacturing Company, St. Paul, Minn., a corporation of Delaware No Drawing. Filed Mar. 1, 1956, Ser. No. 568,698

11 Claims. (Cl. 260—87.5)

This invention relates to halogen-containing polymeric compositions. In one aspect, the invention relates to fluorine-containing polymeric compositions. More particularly in this aspect, the invention relates to fluorine-containing elastomeric and resinous polymeric compositions and the method for their manufacture.

Fluorine-containing polymers have been found to possess many useful applications by reason of their relative chemical inertness and high physical strength and solvent-resistance. By virtue of these properties, such fluorine-containing polymers, or copolymeric compositions, can be fabricated into a wide variety of useful articles having improved chemical and physical stability, or in the form of protective coatings on the surfaces of a wide variety of useful articles. In connection with these uses, it is also desirable, in many instances, for these fluorine-containing polymers to possess elastomeric properties so that a high degree of flexibility, elasticity and extensibility is obtained and which can be easily vulcanized and processed; or when employed as protective coatings, that they be easily dissolved in a wide variety of commercially available solvents.

It is, therefore, an object of this invention to provide new and useful fluorine-containing polymers having desirable chemical and physical characteristics.

Still another object of this invention is to provide new and useful fluorine-containing elastomeric polymers, having the aforementioned characteristics, and which can be easily fabricated into a wide variety of useful articles of improved chemical and physical stability.

Still another object of this invention is to provide new and useful fluorine-containing resinous polymers, useful as protective coatings, having the aforementioned characteristics, and which can be readily applied to the surfaces of a wide variety of useful articles.

A still further object of the invention resides in a process for obtaining these polymers in good yields.

Various other objects and advantages inherent in the invention will become apparent to those skilled in the art from the accompanying description and disclosure.

The monomer perfluorobutyne-2, from which the polymers of the present invention are produced, is prepared by fluorinating hexachlorobutadiene-1,3 with a mixture of antimony fluoride and chlorinated antimony fluoride at a temperature between about 135° C. and about 140° C., for a period of 2 hours to produce the product 1,1,1,4,4,4-hexafluoro-2,3-dichlorobutene-2, having a boiling point of 66–67° C.; thereafter, this product is subjected to dechlorination with a mixture of zinc dust and alcohol to produce perfluorobutyne-2. The preparation of the mononer perfluorobutyne-2 is more completely disclosed in the article by Henne and Finnegan, in the Journal of the American Chemical Society, vol. 71, p. 298.

In a preferred embodiment of the present invention, perfluorobutyne-2 is copolymerized with a fluorinated olefin, such as 1-chloro-1-fluoroethylene or 1,1-difluoro-3-methyl butadiene, to produce new and useful polymeric compositions. In this respect, it is found that these polymeric compositions exhibit better elasticity, increased resistance to oil and hydrocarbon fuels, improved flow properties and better chemical and physical stability over polymers of the aforementioned fluorinated olefins alone. These polymeric products of perfluorobutyne-2 with either 1-chloro-1-fluoroethylene or 1,1-difluoro-3-methyl butadiene, constitute valuable macromolecules and are adaptable to a wide variety of commercial uses. They possess low-temperature flexibility, in addition to the aforementioned properties of chemical and physical stability and resistance to oil and hydrocarbon fuels. They are also selectively soluble in various commercial solvents, and serve as durable, flexible protective coatings on surfaces which are subjected to environmental conditions in which they may come into contact with a wide variety of corrosive substances, such as oils, fuels and strong chemical reagents.

In general, as more fully hereinafter disclosed, the polymeric compositions of the present invention are produced from the polymerization of monomeric mixture containing perfluorobutyne-2 with either 1-chloro-1-fluoroethylene or 1,1-difluoro-3-methyl butadiene as a comonomer at temperatures between about −20° C. and about 150° C., with intermediate temperature ranges being selected with reference to the specific polymerization catalyst system employed. The most useful polymeric compositions of the present invention are copolymers produced from monomeric mixtures containing between about 10 mole percent and about 90 mole percent perfluorobutyne-2 and the remaining major constituent being either 1-chloro-1-fluoroethylene or 1,1-difluoro-3-methyl butadiene. The preferred copolymeric compositions of the present invention are copolymers produced from monomeric mixtures containing between about 20 mole percent and about 75 mole percent perfluorobutyne-2 and the remaining major constituent being either 1-chloro-1-fluoroethylene or 1,1-difluoro-3-methyl butadiene. In producing polymeric compositions from the aforementioned monomeric mixtures containing between about 10 mole percent and about 90 mole percent perfluorobutyne-2, and the remaining major constituent being either of the aforementioned comonomers, it is found that the finished copolymeric product contains between about 1 mole percent and about 25 mole percent perfluorobutyne-2, and the remaining major constituent being either 1-chloro-1-fluoroethylene or 1,1-difluoro-3-methyl butadiene. In producing polymeric compositions from the aforementioned monomeric mixtures containing between about 20 mole percent and about 75 mole percent perfluorobutyne-2, and the remaining major constituent being any of the aforementioned comonomers, it is found that the finished copolymeric product contains between about 5 mole percent and about 15 mole percent perfluorobutyne-2, and the remaining major constituent being either 1-chloro-1-fluoroethylene or 1,1-dfluoro-3-methyl butadiene.

The polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe, an emulsion recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In the emulsion type recipe, the emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acids or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slow-down or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide.

As previously indicated, the polymerization reaction is carried out, in general, at a temperature between about $-20°$ C. and about $150°$ C. When the polymerization reaction is carried out employing a water-suspension type recipe, temperatures between about $5°$ C. and about $100°$ C. are preferably employed. When the polymerization reaction is carried out in the presence of an organic peroxide initiator in a bulk-type polymerization system, temperatures over the entire range of between about $-20°$ C. and about $150°$ C. are employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting unduly the overall yield. Suitable polymerization modifiers include chloroform ($CHCl_3$), Freon–113 ($CF_2ClCFCl_2$), carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not to be construed as limiting its scope.

Example I

A heavy-walled glass polymerization tube of about 300 ml. capacity was flushed with nitrogen and then charged with 60 ml. of a soap solution, prepared by dissolving 15 grams of lauryl sulfonate in 600 ml. of water. The contents of the tube were then frozen, and the tube was then charged with 20 ml. of a 2.5% aqueous solution of ammonum persulfate. The contents of the tube were next refrozen, and thereafter 10 ml. of a 2% aqueous solution of sodium metabisulfite was added. The contents of the tube were next refrozen in liquid nitrogen, and thereafter were added 10 ml. of a 1% aqueous solution of ferrous sulfate heptahydrate. The contents of the tube were then refrozen in liquid nitrogen.

The tube was next connected to a gas-transfer system and evacuated at liquid nitrogen temperature. To the frozen contents of the tube were added, by distillation, 33.5 grams of perfluorobutyne-2 and 13.2 grams of 1-chloro-1-fluoroethylene, which comprised a 50/50 molar ratio.

The polymerization tube was then sealed and rotated end-over-end in a temperature-regulated water-bath at $20°$ C. for a period of 24 hours. At the end of this time, the contents of the tube were coagulated by freezing at liquid nitrogen temperature. The coagulated product was then removed from the tube, washed with hot water and then dried to constant weight in vacuo at $35°$ C. A copolymeric elastomeric product was obtained which was found, upon analysis, to comprise approximately 7 mole percent perfluorobutyne-2 and the remaining major constituent, 1-chloro-1-fluoroethylene, being present in an amount of approximately 93 mole percent. The copolymer was obtained in an amount corresponding to a 13% conversion.

Example II

A heavy-walled glass polymerization tube of about 20 ml. capacity was flushed with nitrogen and then charged with 9 ml. of a soap solution prepared by dissolving 1.5 grams of dodecyl mercaptan and 25 grams of potassium stearate in 900 ml. of water. The pH was adjusted to 10.2 by adding 5% KOH solution as necessary. The contents of the tube were then frozen, and thereafter there was charged to the tube 1 ml. of a catalyst solution of 1.5% aqueous solution of potassium persulfate. The contents of the tube were next refrozen in liquid nitrogen.

The tube was next connected to a gas-transfer system and evacuated at liquid nitrogen temperature. To the frozen contents of the tube were added, by distillation, 3.05 grams of perfluorobutyne-2 and 1.95 grams of 1,1-difluoro-3-methyl butadiene, which comprised a 50/50 molar ratio. The 1,1-difluoro-3-methyl butadiene was prepared by adding dibromofluoromethane to isobutene to produce an adduct,

which was then dehydrobrominated at about 150° C. in the presence of tri-n-butyl amine to yield

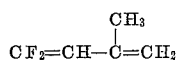

B.P. 34–35° C.

The polymerization tube was next sealed and rotated end-over-end in a temperature-regulated water-bath at 50° C. for a period of 24 hours. At the end of this time, the contents of the tube were coagulated by freezing at liquid nitrogen temperature. The coagulated product was then removed from the tube, washed with hot water and then dried to constant weight in vacuo at 35° C. A copolymeric elastomeric product was obtained which was found, upon analysis, to comprise approximately 10 mole percent perfluorobutyne-2 and the remaining major constituent, 1,1-difluoro-3-methyl butadiene, being present in an amount of approximately 90 mole percent. The copolymer was obtained in an amount corresponding to a 2% conversion.

As previously indicated, the polymeric composition of the present invention possess highly desirable chemical and physical properties which make them useful for fabrication of a wide variety of thermoplastic articles, or for application to various surfaces as protective coatings. In such uses, the raw elastomeric copolymer, such as is produced in accordance with the procedure set forth in the above examples, is extruded or pressed into sheets at temperatures between about 200° F. and about 650° F., and at a pressure between about 500 and about 15,000 pounds per square inch for a period of about 5 to about 60 minutes. Thereafter, various articles can be molded from preforms cut from sheets or extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader, or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented. Other uses for the polymeric compositions of the present invention reside in the fabrication of pressure-sensitive tape for electrical insulation purposes, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

We claim:

1. A process for preparing a polymeric composition which comprises polymerizing a monomeric mixture of perfluorobutyne-2 and a fluorinated olefinic compound selected from the group consisting of 1-chloro-1-fluoroethylene and 1,1-difluoro-3-methyl butadiene, said mixture containing between about 10 mole percent and about 90 mole percent perfluorobutyne-2 and correspondingly between about 90 mole percent and about 10 mole percent of the fluorinated olefinic compound at a temperature between about −20° C. and about 150° C. in the presence of a free radical-forming polymerization promoter.

2. A process for preparing a polymeric composition which comprises polymerizing a monomeric mixture of perfluorobutyne-2 and a fluorinated olefinic compound selected from the group consisting of 1-chloro-1-fluoroethylene and 1,1-difluoro-3-methyl butadiene, said mixture containing between about 20 mole percent and about 75 mole percent perfluorobutyne-2 and correspondingly between about 80 mole percent and about 25 mole percent of the fluorinated olefinic compound at a temperature between about −20° C. and about 150° C. in the presence of a free radical-forming polymerization promoter.

3. A process for preparing a polymeric composition which comprises polymerizing a monomeric mixture of perfluorobutyne-2 and 1-chloro-1-fluoroethylene, said mixture containing between about 10 mole percent and about 90 mole percent perfluorobutyne-2 and correspondingly between about 90 mole percent and about 10 mole percent 1-chloro-1-fluoroethylene at a temperature between about −20° C. and about 150° C. in the presence of a free radical-forming polymerization promoter.

4. A process for preparing a polymeric composition which comprises polymerizing a monomeric mixture of perfluorobutyne-2 and 1-chloro-1-fluoroethylene, said mixture containing between about 20 mole percent and about 75 mole percent perfluorobutyne-2 and correspondingly between about 80 mole percent and about 25 mole percent 1-chloro-1-fluoroethylene at a temperature between about −20° C. and about 150° C. in the presence of a free radical-forming polymerization promoter.

5. A process for preparing a polymeric composition which comprises polymerizing a monomeric mixture of perfluorobutyne-2 and 1,1-difluoro-3-methyl butadiene, said mixture containing between about 10 mole percent and about 90 mole percent perfluorobutyne-2 and correspondingly between about 90 mole percent and about 10 mole percent, 1,1-difluoro-3-methyl butadiene, at a temperature between about −20° C. and about 150° C. in the presence of a free radical-forming polymerization promoter.

6. A process for preparing a polymeric composition which comprises polymerizing a monomeric mixture of perfluorobutyne-2 and 1,1-difluoro-3-methyl butadiene, said mixture containing between about 20 mole percent and about 75 mole percent perfluorobutyne-2 and correspondingly between about 80 mole percent and about 25 mole percent 1,1-difluoro-3-methyl butadiene at a temperature between about −20° C. and about 150° C. in the presence of a free radical-forming polymerization promoter.

7. A process for preparing a polymeric composition which comprises polymerizing in an aqueous system a monomeric mixture containing between about 10 and about 90 mole percent of perfluorobutyne-2 and correspondingly between about 90 and about 10 mole percent of a fluorinated olefinic compound selected from the group consisting of 1-chloro-1-fluoro-ethylene and 1,1-difluoro-3-methyl butadiene in the presence of a water soluble peroxy-type initiator at a temperature between about 5° C. and about 100° C. and a pH between about 7 and 11.

8. A copolymer of perfluorobutyne-2 and 1-chloro-1-fluoroethylene, said copolymer containing between about 5 and about 15 mole percent perfluorobutyne-2 copolymerized therein.

9. A copolymer of perfluorobutyne-2 and 1,1-difluoro-3-methyl butadiene, said copolymer containing between about 5 and about 15 mole percent of perfluorobutyne-2 copolymerized therein.

10. A copolymer of perfluorobutyne-2 and 1-chloro-1-fluoroethylene, said copolymer containing between about 1 mole percent and about 25 mole percent perfluorobutyne-2 copolymerized therein.

11. A copolymer of perfluorobutyne-2 and 1,1-difluoro-3-methyl butadiene, said copolymer containing between about 1 mole percent and about 25 mole percent perfluorobutyne-2 copolymerized therein.

References Cited in the file of this patent
UNITED STATES PATENTS

| | | |
|---|---|---|
| 2,478,933 | Bratton et al. | Aug. 16, 1949 |
| 2,546,997 | Gochenour | Apr. 3, 1951 |
| 2,686,207 | Crane et al. | Aug. 10, 1954 |
| 2,750,431 | Tarrant et al. | June 12, 1956 |
| 2,837,505 | Dittman et al. | June 3, 1958 |
| 2,842,528 | Herbst et al. | July 8, 1958 |